United States Patent
Metz et al.

(10) Patent No.: US 11,058,254 B2
(45) Date of Patent: Jul. 13, 2021

(54) INDUCTION-BASED FOOD HOLDING/WARMING SYSTEM AND METHOD WITH HEIGHT ADJUSTMENT MECHANISM

(71) Applicant: CookTek Induction Systems, LLC, Chicago, IL (US)

(72) Inventors: Reinhard Metz, Wheaton, IL (US); Warren Graber, Hoffman Estates, IL (US); Kevin J. Snyder, Chicago, IL (US)

(73) Assignee: COOKTEK INDUCTION SYSTEMS, LLC, Chicago, IL (US)

( * ) Notice: Subject to any disclaimer, the term of this patent is extended or adjusted under 35 U.S.C. 154(b) by 286 days.

(21) Appl. No.: 16/130,576

(22) Filed: Sep. 13, 2018

(65) Prior Publication Data

US 2019/0008318 A1    Jan. 10, 2019

Related U.S. Application Data (63) Continuation of application No. 15/076,785, filed on Mar. 22, 2016, now abandoned, which is a continuation of application No. 13/895,186, filed on May 15, 2013, now Pat. No. 9,320,389.

(51) Int. Cl.
| | | |
|---|---|---|
| *A47J 36/24* | (2006.01) | |
| *H05B 6/12* | (2006.01) | |
| *A47J 39/02* | (2006.01) | |
| *A47J 27/14* | (2006.01) | |
| *A47J 37/04* | (2006.01) | |

(52) U.S. Cl.
CPC .......... *A47J 36/2483* (2013.01); *A47J 27/14* (2013.01); *A47J 39/02* (2013.01); *H05B 6/12* (2013.01); *H05B 6/1209* (2013.01); *A47J 37/04* (2013.01)

(58) Field of Classification Search
CPC ........ A47J 36/2483; A47J 27/14; A47J 39/02; H05B 6/1209; H05B 6/12
USPC .......... 99/340, 342, 349, 374, 393; 219/478, 219/521, 621, 622
See application file for complete search history.

(56) References Cited

U.S. PATENT DOCUMENTS

| | | |
|---|---|---|
| 9,320,389 B2 | 4/2016 | Metz et al. |
| 2012/0031910 A1 | 2/2012 | Hogestyn |
| 2012/0180705 A1* | 7/2012 | Hafner ................... B23D 31/00 108/50.13 |
| 2012/0223070 A1 | 9/2012 | Matsui et al. |
| 2012/0294990 A1 | 11/2012 | Graber et al. |
| 2012/0312804 A1 | 12/2012 | Brosnan et al. |

(Continued)

FOREIGN PATENT DOCUMENTS

CN        202092194 U   * 12/2011

OTHER PUBLICATIONS

The technology used by CookTek in its Sinaqua Waterless Food Holding System, see www.CookTek.com, Apr. 2018.

(Continued)

*Primary Examiner* — Thien S Tran
(74) *Attorney, Agent, or Firm* — Michael Best & Friedrich LLP (57) ABSTRACT

A device, system and method for induction heating food service pans having differing depths, while maintaining the pans sufficiently closely adjacent an enclosure containing the induction heating power source.

19 Claims, 6 Drawing Sheets

(56) References Cited

U.S. PATENT DOCUMENTS

2014/0238383 A1\* 8/2014 Armstrong ............ A47B 57/06
126/337 A

OTHER PUBLICATIONS http://www.dukemfg.com/products/Default.aspx?category=WEBSITE_THURMADUKE_HOT_FOOD_UNITS, 2013.
http://www.dukemfg.com/products/Default.aspx?category=WEBSITE_DROP_EXP_ELEM_HOT_WELL, 2013.

\* cited by examiner

INDUCTION-BASED FOOD HOLDING/WARMING SYSTEM AND METHOD WITH HEIGHT ADJUSTMENT MECHANISM

This continuation application claims priority from the U.S. Ser. No. 13/895,186, filed May 15, 2013 ("the Parent Case").

BACKGROUND OF THE INVENTION

Pending U.S. Ser. No. 13/112,221, filed May 20, 2011, titled "Induction-Based Food Holding/Warming System And Method," published as U.S. Publication No. 2012-0294990-A1 on Nov. 22, 2012, is incorporated by reference herein in its entirety.

The present invention generally relates to typical food service, food-holding/warming systems and methods for food pan/dish inserts. Systems and methods according to the present invention replace the hot water/steam approach with an induction heating/warming system. This invention takes an induction-based holding/warming/heating unit and makes it adjustable to accommodate a variety of standard depth pans.

Typical food service, food-holding/warming systems use a variety of pans, typically stainless steel, with a common overall maximum rectangular footprint. This footprint accommodates full-size pans, 2 half-size pans, ⅓ size, ⅙ size pans, etc. The pans further come in several standardized depths (in inches): 2½, 4, 6, and some 1¼.

In what are known as "steam table" applications, these pans are dropped into standard size counter cut-outs, which are in turn located over a hot water or steam bath below. The various depth pans may be heated from below by locating the hot water at or below the lowest point a pan will reach, or allowing the pans to dip into the water as needed. Variable pan/pan depth is thus semi-automatically accommodated.

Steam tables have proven effective, but have several disadvantages. One principal disadvantage is that a hot water/steam approach is substantially less energy efficient than an induction heating system approach. Further, given the thermal inertia of the water, the steam is relatively slow to heat the food, and the temperature can be difficult to predict and control. Replenishment of the water, and particularly availability of gas if the steam tables are gas-driven, can also be an issue given the locale (e.g., an airport, remote location, etc.). Other disadvantages of steam table systems are the requirement for a water supply and associated drainage, and the relatively demanding maintenance and sanitation procedures.

In an induction-based food holding/warming/heating system, the induction energy source, such as the induction coil in an induction unit, must be placed within close proximity to the bottom of the heating/warming pans. For multiple depth pans, this may be accomplished with different depth units. However, in the induction heating application, different depth units require a pre-determination of what depth pans will be used, given the location of the induction coil of the induction unit.

Accordingly, it would be advantageous to avoid the use of steam tables, and utilize an induction heating/warming system and method for pans and pans used in the food service industry, which can be used with pans and pans having differing depths.

Definition of Claim Terms

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Sufficiently closely adjacent" means that a portion of the power induction enclosure that includes one or more temperature sensors and induction inverters and associated induction coils, is maintained closely adjacent to the bottom surface of the one or more food service pans, so that heating energy may be properly induced, and also to permit the temperature of the pans to be monitored, allowing an operator to maintain the temperature of the food service pans within desirable limits. While with existing technology this distance may be one centimeter or less (such as with the technology used by CookTek in its Sinaqua Waterless Food Holding System, see www.CookTek.com), with different technology (e.g., different temperature sensors and/or different induction heating controls) it will be appreciated that a "sufficiently closely adjacent" distance may vary.

"Pan" means any food service container that may be used to hold foods or liquids, to be induction-heated and/or warmed, including pans, trays or other such containers.

SUMMARY OF THE INVENTION

The objects mentioned above, as well as other objects, are solved by the present invention, which overcomes disadvantages of prior induction heating/warmnning systems and methods for pans used in the food service industry, while providing new advantages not previously obtainable with such systems and methods.

One preferred embodiment includes an induction heating device with a housing, one or more food service pans having differing depths, and an induction power enclosure fitting within the housing for heating the one or more food service pans. The enclosure may contain an induction coil(s) and the power inverter electronics. To protect the electronics, the interior of the enclosure is preferably separated by an enclosure boundary from a bottom surface of the food service pans.

The device also includes a plurality of height adjustment mechanisms facilitating the induction heating of the pans by maintaining a bottom surface of the pans sufficiently closely adjacent to the induction power enclosure to enable adequate magnetic coupling for induction heating of the pans and to permit temperature monitoring of the pans. Two height adjustment mechanisms may be used, for example, having first portions mounted on opposing inner surfaces of the housing, and second portions mounted on opposing outer surfaces of the enclosure.

The plurality of height adjustment mechanisms are configured to permit the induction power enclosure to be moved vertically up and down relative to the housing. This enables an upper portion of the enclosure to be maintained in proximity to the bottom surface of the food service pan(s), or sufficiently closely adjacent, to ensure adequate magnetic coupling for induction heating of the pans and to enable temperature monitoring of the pans. For this latter purpose, an upper portion of the enclosure may include one or more temperature sensors.

In the preferred embodiment, the first portions of the height adjustment mechanisms may include a plurality of vertically-aligned detents, such as stamped notches, arranged in a column, each of which may be selectively engaged by a pin. Also in the preferred embodiment, the second portions of the height adjustment mechanisms may include a rotating lever, such as a leaf spring having a pin, for engaging the notches. In a particularly preferred embodiment, to facilitate selective coupling and release of the pin, each notch may have opposing surfaces that slope downwardly to the center of the notch, and the notch can be wider at its bottom than at its top.

Also in a preferred embodiment, the first portion of each height adjustment mechanism may also include upper and lower ramps attached to or integral with the inner surface of the housing, with the upper ramp being located above the upper-most detent in a column, and the lower ramp being located below the lower-most detent in the column.

In an alternative embodiment, an induction heating system for food service pans having differing depths is provided. The system may include a housing having a housing ledge, one or more of the food service pans having a lip supported by the housing ledge, and an induction power source contained within an enclosure. The system may also include a plurality of height adjustment mechanisms permitting the height of the enclosure to be vertically adjusted relative to the housing, thereby enabling an upper surface of the enclosure to be maintained sufficiently closely adjacent to a bottom surface of the food service pans to enable adequate magnetic coupling for induction heating of the pans. In this alternative system, one or more temperature sensors may be located at an upper portion of the enclosure, enabling temperature monitoring of the pans. The height adjustment mechanisms may each include a plurality of detents, such as but not limited to stamped notches, that may be selectively engaged by a pin mounted on a rotating lever.

In yet another alternative embodiment of the present invention, a method is provided for induction heating food service pans having differing depths, including the step of providing a housing supporting an induction power enclosure and the food service pans, and also providing a plurality of height adjustment mechanisms. The method also includes the step of adjusting the height of the enclosure based on the depth of the food service pan or pans being used, so that an upper surface of the enclosure is sufficiently closely adjacent a bottom surface of the food service pan or pans to enable adequate magnetic coupling for induction heating of the pans. The method also includes the step of induction heating the pan or pans and, preferably, monitoring the temperature of the food service pan or pans, and displaying the temperature to an operator.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

The components in the drawings are not necessarily to scale, emphasis instead being placed upon clearly illustrating the principles of the present invention.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
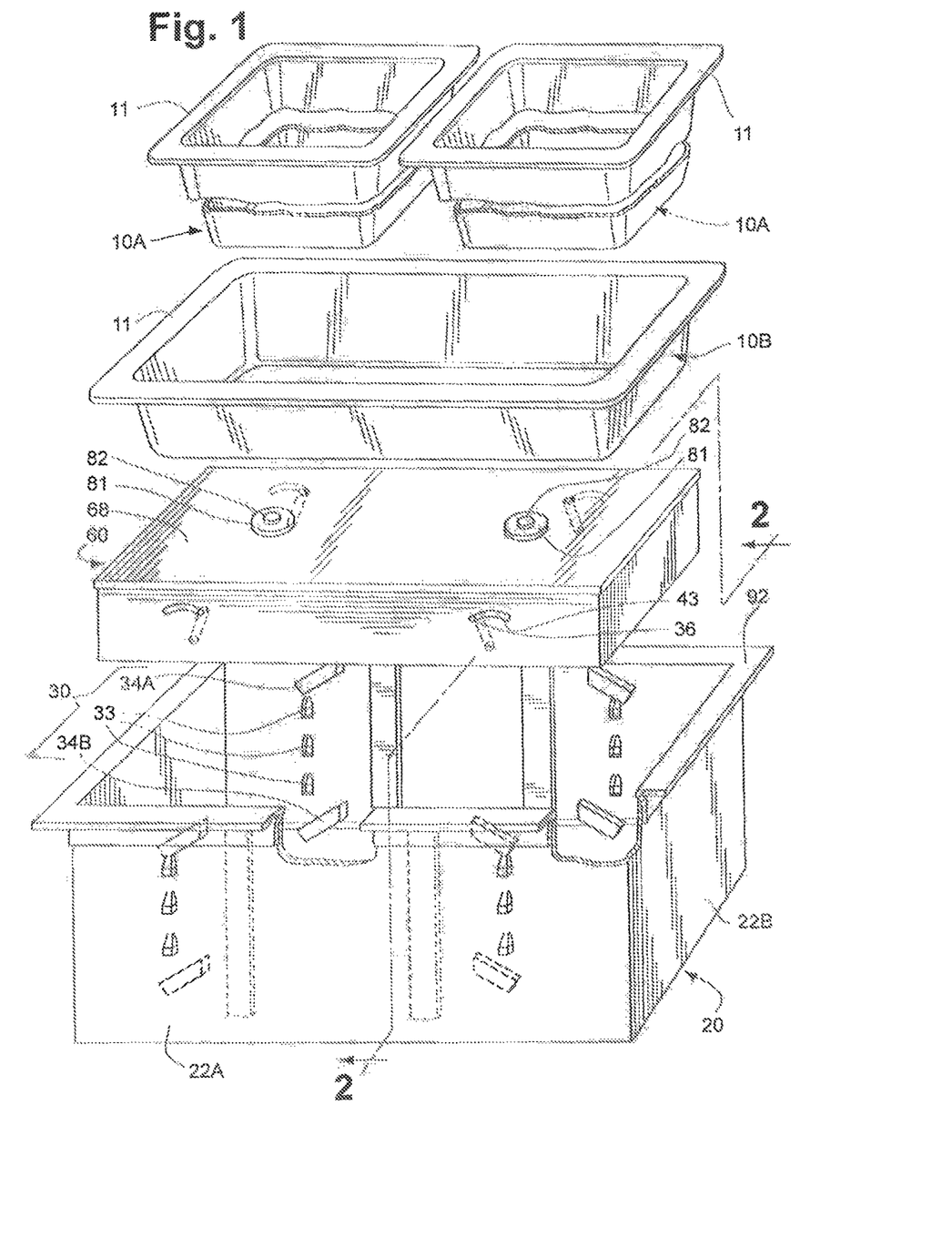
FIG. 1 is a perspective view of the heating/warming pans having differing depths which may be used with one preferred embodiment of the invention shown here.
Figure 2:
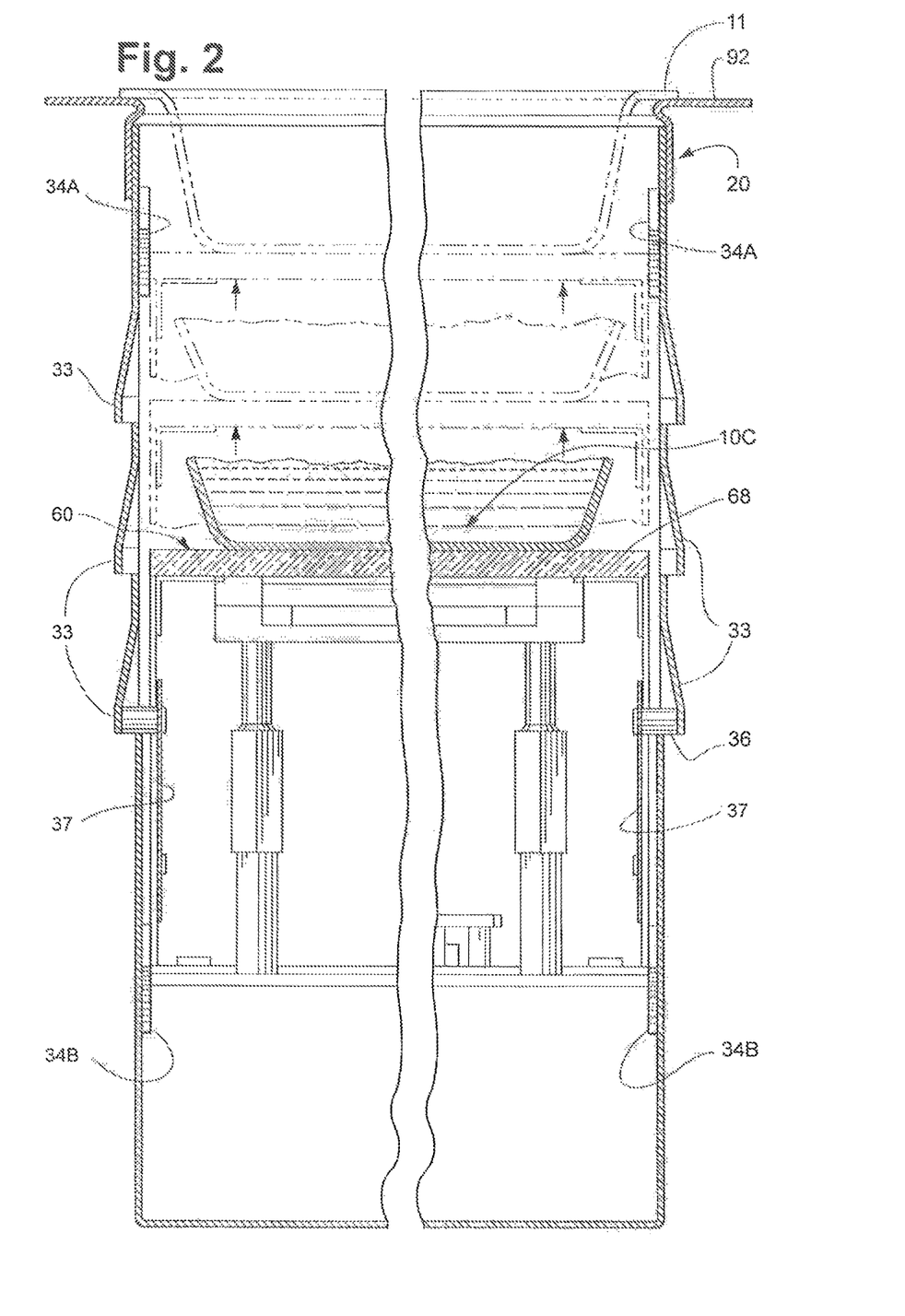
FIG. 2 is a view taken along reference line 2-2 of FIG. 1.
Figure 3:
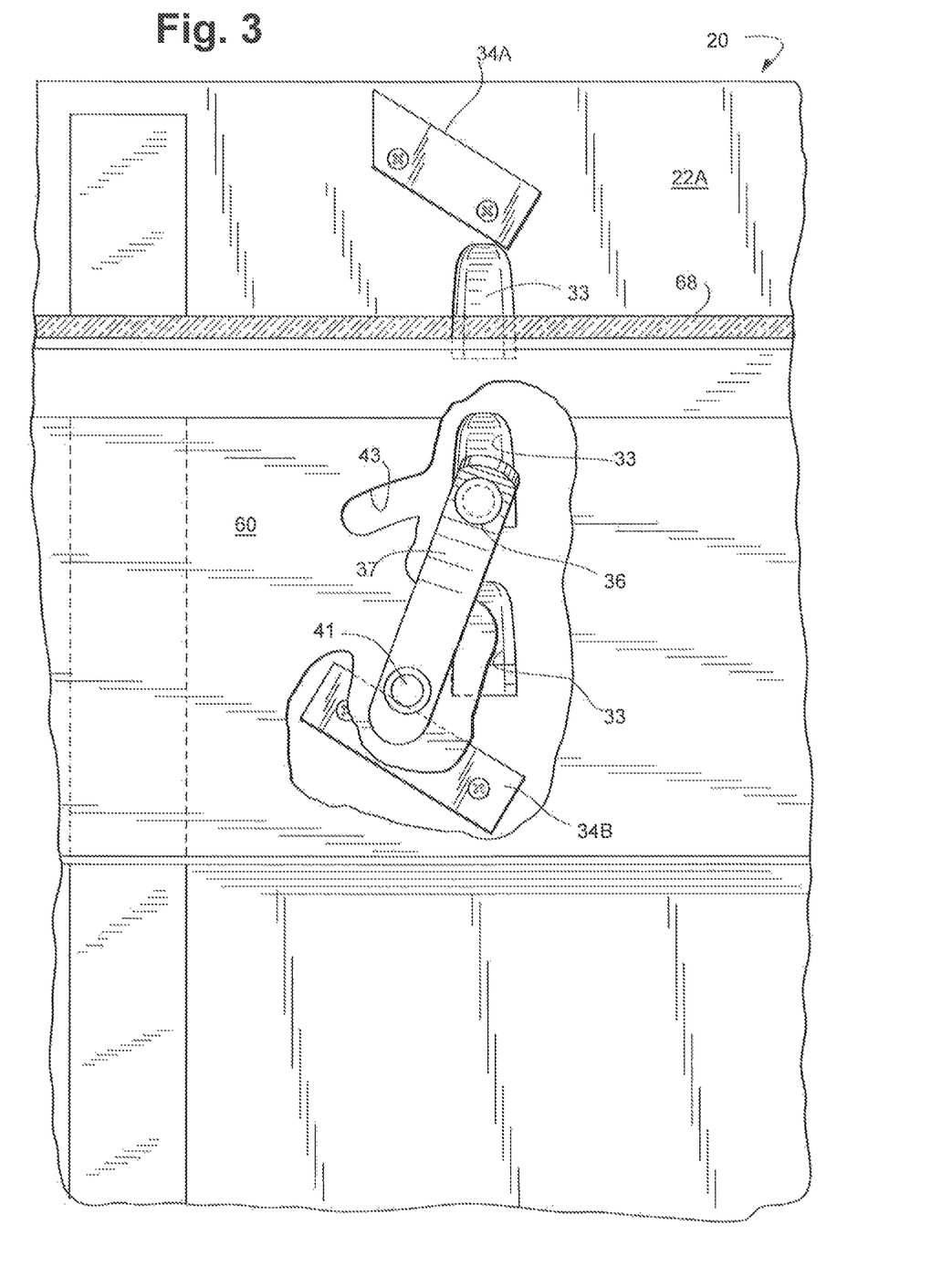
FIG. 3 is a view taken along reference line 3-3 of FIG. 1.

Referring first to FIG. 1, a preferred induction heating unit, generally designated by reference numeral 20, may be used with any of various food heating/warming pans 10A and 10B, having differing depths and a pan ledge 11. An enclosure 60 housing the induction coil and power inverter electronics 50 (FIGS. 3 and 9) for the induction system, may be located below pan(s) 10. Unit 20 may be made of stainless steel and may include an outer housing or shell 22 having inner surface 22A, outer surface 22B, and upper housing ledge 92. Pan 10 carrying food or liquid may be placed down into the upper open cutout of housing 20 such that pan ledge 11 is supported by upper housing ledge 92.

In the preferred embodiment, power induction enclosure 60 may be moved up or down using a height adjustment mechanism 30, described in detail below, so that the top of enclosure 60 stays closely adjacent to the bottom of pan(s) 10. This will maintain, for example, temperatures sensors 80, which may be located in an upper portion of enclosure 60, in closely adjacent location with the bottom surface of pan 10, enabling sensors 80 to electronically communicate temperature information concerning pans 10 to the inverter electronics 50, and then (for example) to a readable display adjacent housing 20 (not shown).

Figure 9:
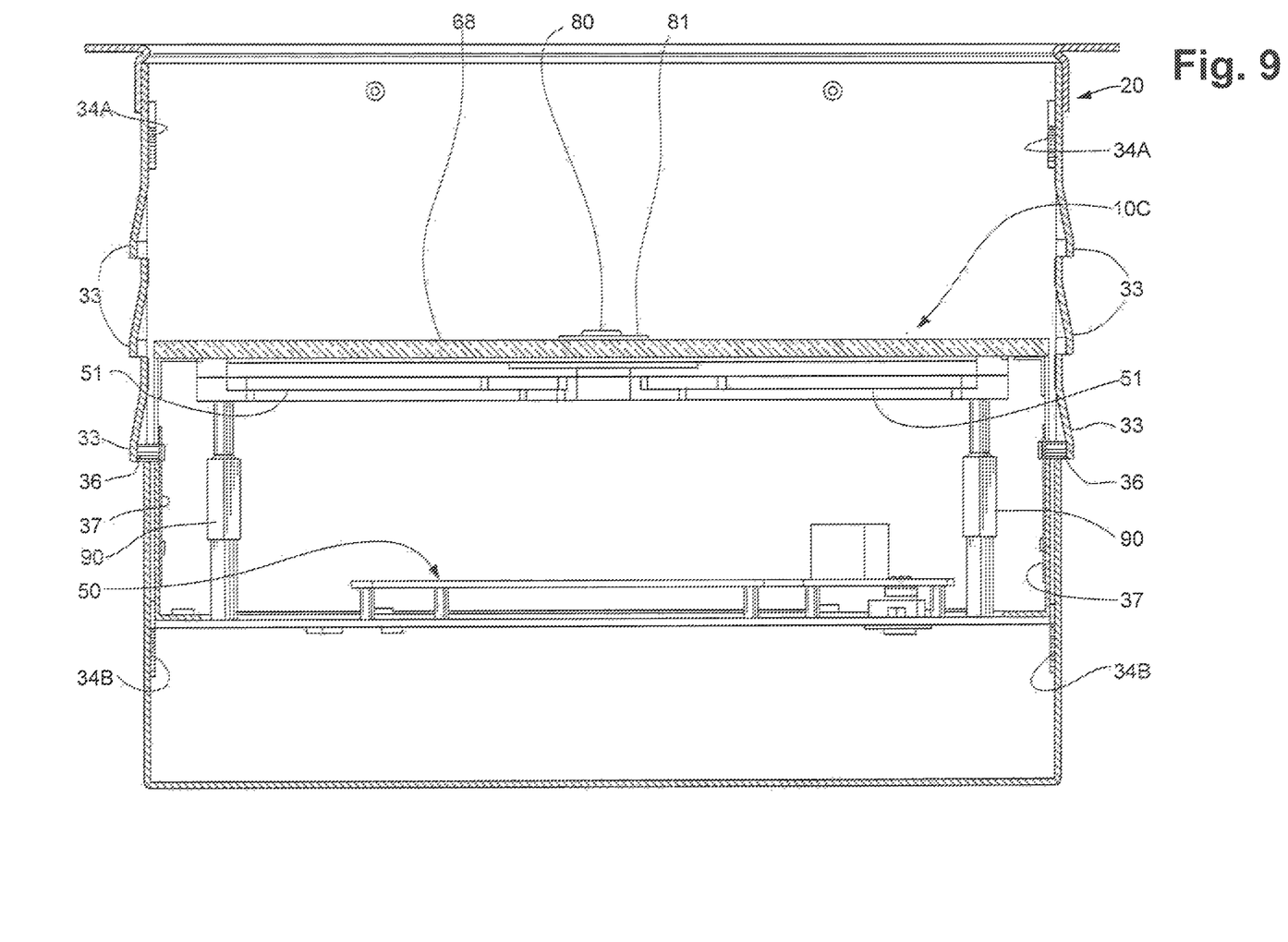
FIG. 9 is a side view of preferred opposing height adjustment mechanisms.

Referring now to FIGS. 1 and 9, enclosure 60 may include an upper wall 68 to seal the induction electronics from the food pan. Enclosure 60 may also include temperature sensors 80 (which may be surrounded by a rubber bellows 81 to allow the sensors to slightly move relative to the pan), for using in monitoring the pan temperature. For this purpose, the lower surface of pan 10 should be kept closely adjacent to wall 68 of enclosure 60 where temperature sensors 80 are located (e.g., within about 1 centimeter of the induction coil and in contact with the sensors, given existing technology).

Figure 8:
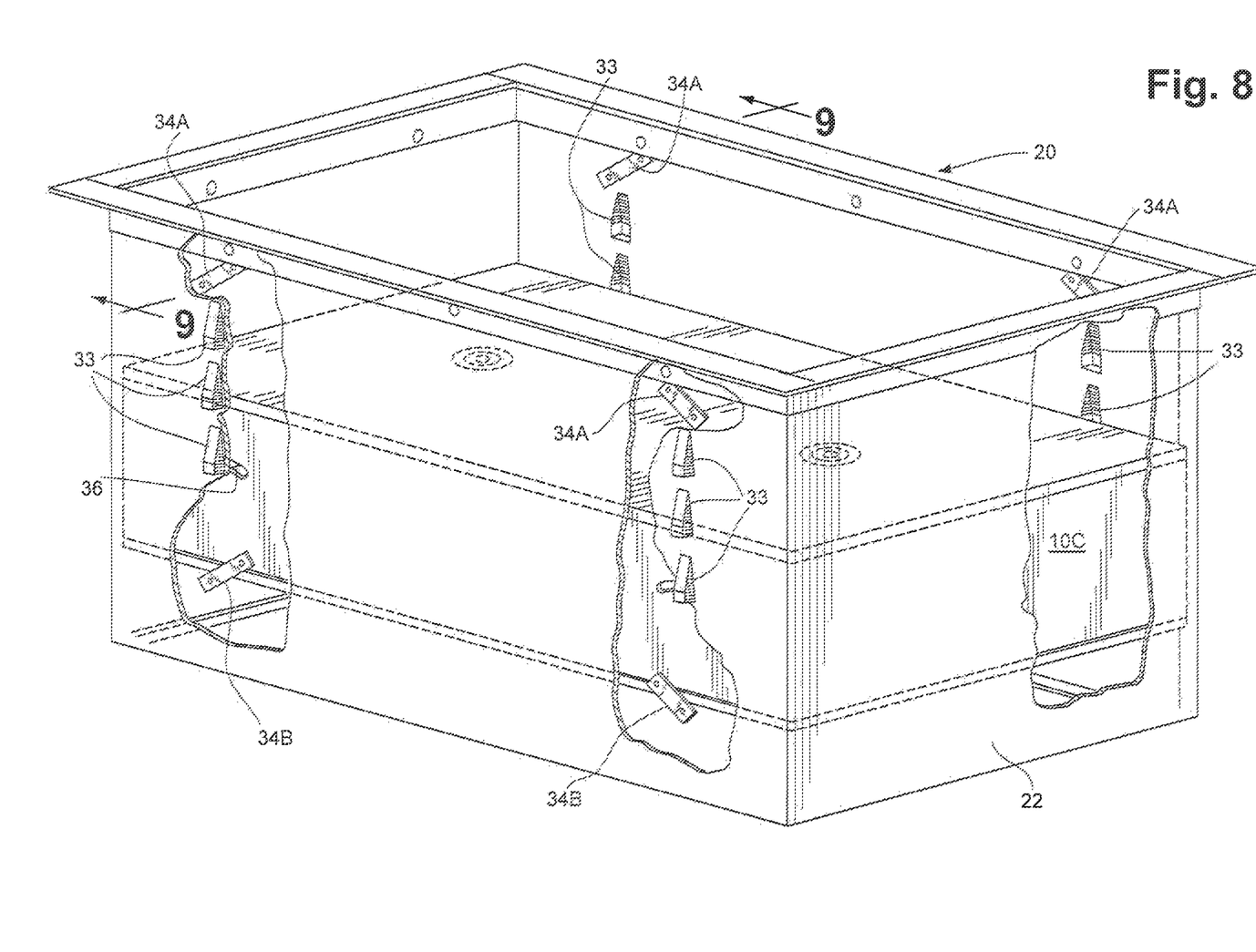
FIG. 8 is a perspective view of a preferred embodiment of the portion of the enclosure height adjustment mechanisms of the present invention that may reside on shell 22, with two pairs of the mechanism portions employed on opposing sides.

Referring to FIGS. 1, 3 and 4-7, to adjust the depth of the pan relative to the induction heating equipment carried by enclosure 60, in a particularly preferred embodiment, unit 20 may be equipped with a plurality of height adjustment mechanisms 30. Preferably, two or four such mechanisms 30 may be used, and may be located at one per end, one per corner, or two per side (see FIG. 8), for example, to provide sufficient and symmetric support for pan 10.

Each height adjustment mechanism 30 may include a number of vertically aligned notches 33, with the uppermost and lowermost notches 33 of any vertical column of notches circumscribed by angled upper and lower ramps 34A, 34B, respectively. Enclosure 60 may include circumferential cutout 43 and rotating lever 37. Lever 37 may be a leaf spring, for example, which can be rotated about pin 41 fixed to the side of enclosure 60. An opposite end of lever 37 may carry pin 36. Lever 37 and cutout 43 may be sized and shaped so that the movement of pin 41 is circumscribed by cutout 43 as lever 37 is rotated.

Each notch 33 may be sized and shaped, and spaced relative to the other notches within each column of notches, and with an adjacent column of notches, so that when it is engaged by pin 36, an upper portion of enclosure 60 may be maintained closely adjacent to the bottom surface of pan 10. (For example, if the most common pan depths vary between X, Y and Z inches, the notches within a column may be spaced from each other corresponding distances X, Y−X and Z−Y.) Notches 33 for different mechanisms 30 work together, allowing different portions of pan 10 carried by different mechanisms 30 to be positioned at the same height.

Figures 4, 5, 6, 7:
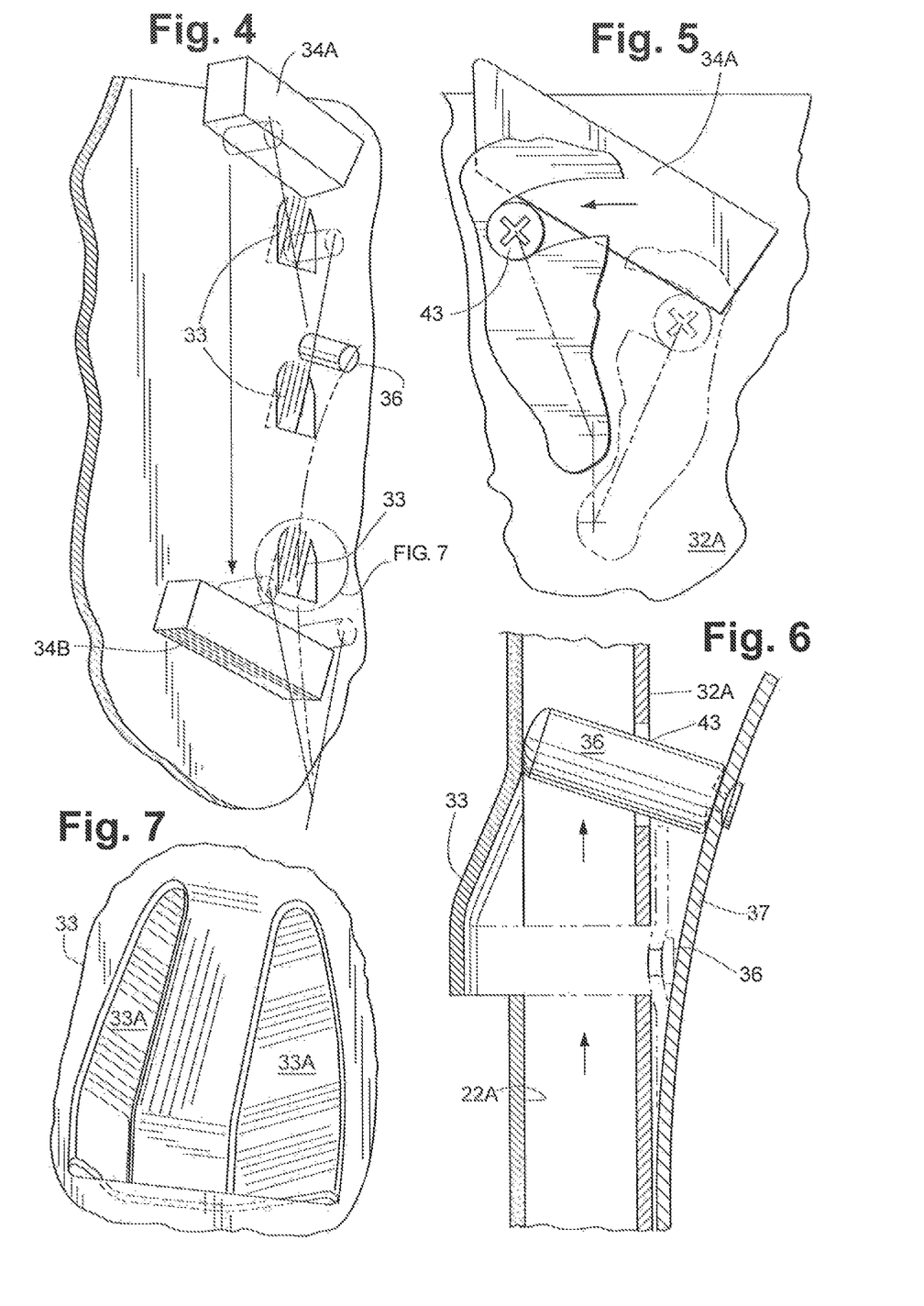
FIGS. 4-6 are enlarged views of components of the enclosure height adjustment mechanism shown in FIG. 1, shown at various states in its preparation.
FIG. 7 is an enlarged view of a preferred embodiment of the notch circled in FIG. 4.

In operation of the preferred embodiment, enclosure 60 may be supported by shell 20 at a desired height, using height adjustment mechanisms 30, with pins 36 engaging the bottom edges of notches 33. When it is desired to use a different pan having a different depth, enclosure 60 may be lifted, allowing individual pins 36 of each height adjustment mechanism 30 to ride up and out of their corresponding notches 33 due to the nature of each notch 33 (discussed in more detail below). Referring to FIGS. 4-6, as enclosure 60 is lifted up to the higher, next set of notches 33, pins 36 will release from their current notches and leaf springs 37 will snap pins 36 into these next, higher set of notches. If pins 36 are lifted further, after leaving the top set of notches, pins 36 will engage upper ramp 34A, rotating leaf spring 37 to its second position, off the line of notches, and allowing enclosure 60 to now be lowered down to its lowest position, where pins 36 engage lower ramp 24B, returning leaf spring arm 37 to its other rotated position in line with the bottom set of notches 33.

Progressively moving height adjustment mechanisms 30 up through all notches 33, to the top, then back down to the bottom, represents the complete cycle and method of positioning mechanism 30 at each of the designed-in and predetermined heights. Mechanisms 30 may be moved up and down by way of this cycle repeatedly. In a typical food service application, this up-and/or-down movement may be necessary during various times of the day, as dictated by the different depth pans required for different foods or services.

In an alternative embodiment, this up-and-down movement/repositioning may be facilitated by the inclusion of handles on induction unit 60 (not shown). Alternatively, the lifting handles may be in the form of suction cups that attach to the top of the induction unit so that the handles may be removed from the induction unit, as desired.

Referring to FIG. 7, the shape of the notches 33 can facilitate the use of height adjustment mechanisms 30. In a preferred embodiment, the notches may be stamped to have a shape such that each notch may be punched/disposed in a manner that: (1) its depth is at a maximum (relative to otherwise planar inner surface 32A of mechanism 30) at its lower-most/bottom location, and its depth gradually decreases moving upward along the notch; and (2) the notch outer surfaces 33A slope (relative to inner surface 32A of mechanism 30) from its outer edges (minimum depth) down to its center (maximum depth). This notch shape has been found preferable to facilitate entry of pin 36 and hold it in place, while also facilitating the pin's exit when desired.

Referring now to FIG. 9, in a preferred embodiment, enclosure 60 preferably includes a solid floor or boundary 68 to separate the inner portion of food warming pan 10 from enclosure 60 containing the inverter power electronics 50 and induction coil 51. Posts 90 may be used to help support wall 68 and to keep induction coils 51 in place.

It will be appreciated that advantages of the induction heating/warming system for food service pans disclosed in pending U.S. Ser. No. 13/112,221, such as the induction heating units disclosed there, the use of material having a low relative magnetic permeability, and fan elimination, may but need not be retained by the present invention.

The pan height adjustment mechanism may be implemented with a number of variations, adaptations, or alternatives. For example, the notches, instead of being stamped into the metal housing, may be implemented in molded plastic tracks. As another non-limiting example, the pin and notch system could be made so that pulling up on enclosure 60 does not automatically move the system, but rather actuates a release mechanism, such as a release lever.

The above description is not intended to limit the meaning of the words used in the following claims that define the invention. For example, while various preferred and less preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

We claim:

1. An induction heating assembly comprising:
a housing having a plurality of sidewalls;
a power induction enclosure; and
a plurality of height adjustment mechanisms configured to adjust a height of the power induction enclosure within the housing, each height adjustment mechanism including
a first notch formed at a first height in one sidewall of the plurality of sidewalls,
a second notch formed at a second height in the one sidewall of the plurality of sidewalls, and
a self-biasing lever coupled to the power induction enclosure and having a pin affixed thereto, the pin configured to selectively engage the first notch and to selectively engage the second notch to partially support the power induction enclosure within the housing, the first notch including an inner surface angled with respect to the one sidewall, wherein the first notch and the self-biasing lever are each configured such that vertical movement of the power induction enclosure within and upwardly relative to the housing causes the pin to ride up the inner surface of the first notch and out of the first notch to automatically release the pin from engagement with the first notch for engagement with the second notch.

2. The induction heating assembly of claim 1, wherein each height adjustment mechanism further includes a first ramp surface coupled to or integrally formed with the one sidewall above the second notch and a second ramp surface coupled to or integrally formed with the one sidewall below the first notch.

3. The induction heating assembly of claim 2, wherein the self-biasing lever is configured to rotate upon contact with the first ramp surface and upon contact with the second ramp surface.

4. The induction heating assembly of claim 1, wherein the housing is configured to support a pan over the power induction enclosure.

5. The induction heating assembly of claim 1, wherein the plurality of height adjustment mechanisms includes four height adjustment mechanisms.

6. The induction heating assembly of claim 1, wherein the self-biasing lever is in the form of a leaf spring.

7. An induction heating assembly comprising:
a housing having a plurality of sidewalls;
a power induction enclosure configured to fit within the housing; and
a height adjustment mechanism configured to adjust a height of the power induction enclosure relative to the plurality of sidewalls between a first height position and a second height position in response to vertical movement of the power induction enclosure within the housing,
wherein the height adjustment mechanism includes a first portion projecting from an exterior surface of the power induction enclosure and a second portion formed in an interior surface in one sidewall of the plurality of sidewalls, wherein the first portion is coupled to the power induction enclosure such that a constant biasing force pushes the first portion toward engagement with the second portion, and the second portion is positioned and configured to removably receive and engage the first portion to support the power induction enclosure within the housing, and
wherein the first portion and the second portion are each configured such that vertical movement of the power induction enclosure within and upwardly relative to the housing causes the first portion to ride up and move outward from the second portion against the constant biasing force to automatically release the first portion from engagement with the second portion for movement of the power induction enclosure from the first height position to the second height position.

8. The induction heating assembly of claim 7, wherein the first height position is one of at least three discrete height positions relative to the plurality of sidewalls.

9. The induction heating assembly of claim 7, wherein the first portion of the height adjustment mechanism includes a pin coupled to the power induction enclosure via a lever and the second portion of the height adjustment mechanism includes a plurality of vertically spaced notches formed in one sidewall of the plurality of sidewalls, and wherein the pin is configured to support the power induction enclosure through engagement with any one notch of the plurality of vertically spaced notches.

10. The induction heating assembly of claim 9, wherein the plurality of vertically spaced notches includes at least three vertically spaced notches.

11. An induction heating assembly comprising:
a housing having a plurality of sidewalls;
a power induction enclosure configured to fit within the housing; and
a height adjustment mechanism configured to adjust a height of the power induction enclosure relative to the plurality of sidewalls between a first height position and a second height position in response to vertical movement of the power induction enclosure within the housing and parallel to a plane coincident with one sidewall of the plurality of sidewalls,
wherein the height adjustment mechanism includes
a projection extending from an exterior surface of the power induction enclosure, and
a plurality of vertically aligned and spaced recesses formed in an interior surface of the housing, wherein each recess of the plurality of recesses is positioned and configured to removably receive and engage the projection to support the power induction enclosure,
wherein the projection is biased to automatically engage each recess of the plurality of recesses in sequence upon vertical movement of the power induction enclosure within and upwardly relative to the housing, and
wherein each recess of the plurality of recesses is configured such that the projection rides up and out of the recess to automatically release the projection from engagement with the recess upon vertical movement of the power induction enclosure within and upwardly relative to the housing.

12. The induction heating assembly of claim 11, wherein each recess of the plurality of recesses is formed as a notch to support the power induction enclosure.

13. The induction heating assembly of claim 12, wherein each notch includes an inner surface angled with respect to the plane.

14. The induction heating assembly of claim 12, wherein the projection is formed as a self-biasing lever coupled to the power induction enclosure and having a pin affixed thereto, the pin configured to selectively engage each notch.

15. The induction heating assembly of claim 14, wherein the self-biasing lever is in the form of a spring.

16. The induction heating assembly of claim 11, wherein the height adjustment mechanism is configured to adjust the height of the power induction enclosure between the first height position and the second height position, between the second height position and a third height position, and between the third height position and the first height position in response to movement of the power induction enclosure within the housing parallel to the plane.

17. The induction heating assembly of claim 16, wherein each height adjustment mechanism further includes a first ramp surface coupled to or integrally formed with the one sidewall above the second notch and a second ramp surface coupled to or integrally formed with the one sidewall below the third notch.

18. The induction heating assembly of claim 17, wherein upon vertical movement of the power induction enclosure vertically upward within and relative to the housing to move the projection into contact with the first ramp, the first ramp is positioned to automatically move the projection in a first direction out of alignment with the plurality of recesses and upon subsequent vertical movement of the power induction enclosure vertically downward within and relative to the housing to move the projection into contact with the second ramp, the second ramp is positioned to automatically move the projection in a second direction into alignment with the plurality of recesses.

19. The induction heating assembly of claim 18 wherein each recess of the plurality of recesses is formed as a notch to support the power induction enclosure and having an inner surface angled with respect to the plane and the projection is formed as a self-biasing lever coupled to the power induction enclosure and having a pin affixed thereto, the pin configured to selectively engage each notch.

* * * * *